United States Patent [19]
Wientke et al.

[11] Patent Number: 5,104,360
[45] Date of Patent: Apr. 14, 1992

[54] APPARATUS FOR ACTUATION OF SHIFT ELEMENTS

[75] Inventors: Friedrich Wientke; Günter Dieterich, both of Kamen, Fed. Rep. of Germany

[73] Assignee: Maschinenfabrik Stromag G.m.b.H., Unna, Fed. Rep. of Germany

[21] Appl. No.: 660,325

[22] Filed: Feb. 22, 1991

[51] Int. Cl.$^5$ ............................................. F16H 21/00
[52] U.S. Cl. ................................. 474/152; 74/412 R
[58] Field of Search ............... 474/152, 158, 159, 84, 474/78, 69; 74/412 R, 413, 431, 445, 457

[56] References Cited

U.S. PATENT DOCUMENTS 2,810,164 10/1957 Ambler et al. ................... 474/84 X
4,165,658 8/1979 Ueno et al. ............................ 74/412

FOREIGN PATENT DOCUMENTS 3011133 10/1981 Fed. Rep. of Germany.

*Primary Examiner*—Thuy M. Bui
*Attorney, Agent, or Firm*—Biebel & French

[57] ABSTRACT

An apparatus provided with a planet transmission gear drive with which transmission gear drive stages are constructed built-up and including the hollow-gear or annular gear ring arrangement fixed on the housing and planet carrier support arranged rotatably moveable with the planets. A shaft connected directly with a drive unit has a sun gear fastened thereon to drive the first transmission gear drive stage in order to attain a reduced reversal or return play. The end switch or shifter for drive units further has the last transmission gear drive stage including a hollow-gear or annular gear ring of the first transmission gear drive part arranged rotatable in the housing. The hollow-gear or annular gear ring forming the last transmission gear drive stage is provided with an outer tooth arrangement in which an adjustment worm guided in the housing meshes in engagement.

2 Claims, 6 Drawing Sheets

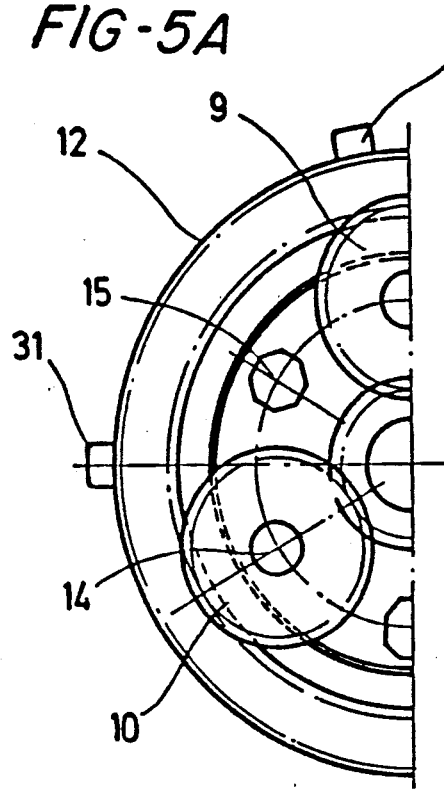
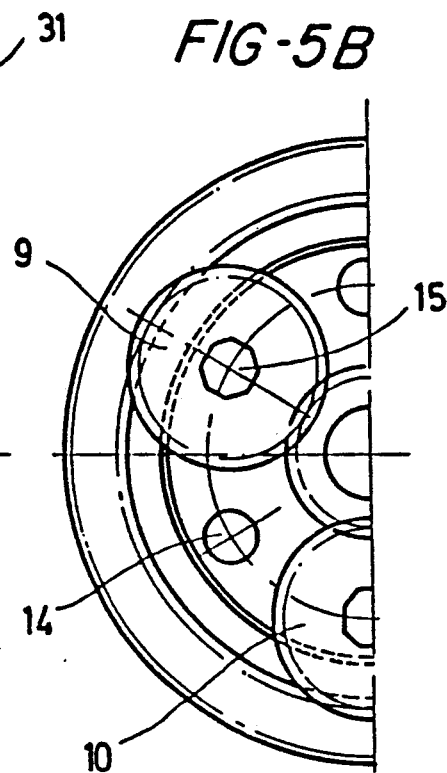
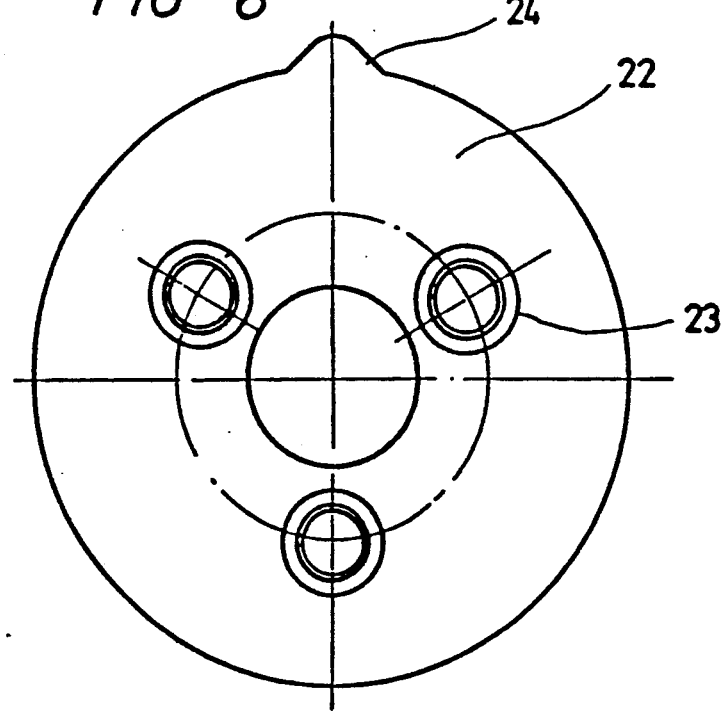
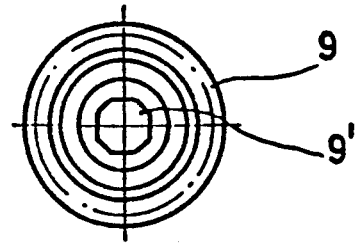

APPARATUS FOR ACTUATION OF SHIFT ELEMENTS

BACKGROUND OF THE INVENTION

1. Field of the Invention

The present invention pertains to an apparatus for actuation of shift elements with a multi-stage planetary transmission gearing system reducing the drive speed of a separate drive unit, which planetary transmission gearing system driving a shift part which actuates a shift element after a prescribable turning or rotation.

2. Description of the Prior Art

A known apparatus of this type has a planetary drive means or transmission with a high return or reversal play, since on the one hand the annular gear rims of the gear transmission stages are rotatably movably arranged upon a power axis and, on the other hand, the drive movement is introduced indirectly.

With an apparatus of this type disclosed by German Patent 30 11 133, which is employed especially for actuation of control-current end switches or shift controllers, there is provided a multi-stage planetary gear transmission drive reducing the drive speed. The planetary drive has a central shaft or insert axis, which for each step or stage carries an annular gear mounting arranged rotatably moveable on the shaft or insert axis, which annular gear mounting on one side is provided with an inner tooth means and on an opposite side being provided with an external tooth means of smaller diameter. Planetary carriers or supports are arranged rigidly upon the shaft or insert axis, which planetary carriers or supports hold the meshing planets of the planetary transmission gearing system against the inner tooth means of the annular gear ring means. The first drive or transmission stage of the planetary transmission gearing system is driven via a sun gear journalled rotatably moveable upon the shaft or insert axis, which sun gear is connected with a separate drive unit via a drive pinion arranged on a shaft journalled in alignment or overhung. The last drive stage has a rotatably arranged planetary carrier or support on which a hollow cylinder is fastened, that is provided with a cam for actuation of the switching or shift elements. The known apparatus has a larger, grate reversal or return play as a consequence of the hollow gear or annular gear ring means arranged upon the insert axis or shaft and the indirectly introduced drive movement.

SUMMARY OF THE INVENTION

An object of the invention is based thereon to embody an apparatus of the foregoing generic type in such a manner that the return or reversal play is reduced.

This object is resolved with an apparatus of the aforementioned type via the provision of a shaft connected directly with a separate drive unit in the housing of a planetary transmission gearing means, so that each and every drive or transmission stage has planetary carrier or support means arranged coaxially and rotatably moveable relative to the shaft, on which planetary carrier or support a planet is held which meshes against a hollow gear or annular gear ring means fixed relative to the housing, whereby the first drive or transmission stage has a driven sun gear arranged upon the shaft and in at least one further drive or transmission stage the shift part is fastened on the planetary carrier or support means thereof. A greater stiffness or rigidity of the transmission drive means is attained hereby and with that a smaller, more nominal reversal or return play is attained. Since the drive no longer occurs indirectly via a spur-wheel transmission drive stage as with the known apparatus but rather occurs directly upon the sun gear from the drive shaft connected with the drive unit, also no center distance errors arise or occur with the new apparatus. The drive moment is transmitted centrally and uniformly upon the planetary gears.

An advantageous embodiment of the invention provides that the planetary transmission gearing system is equipped with planetary carriers or supports, which are mounted or journalled rotatably moveable either upon the shaft or on the hollow-gear or annular gear ring means.

The planetary carriers or supports can be embodied with an external or outer tooth means for driving of planets. Such planetary carriers or supports accordingly transmit the rotational movement between two transmission drive stages.

An advantageous embodiment of the invention provides that the hollow-gear or annular gear ring means of the transmission drive stages are made identical. Hereby there is produced or created an especially simple to produce planetary transmission gearing drive system.

The hollow-gear or annular gear ring means can be embodied with an inner- and outer tooth means. The planets of the individual transmission drive stages mesh against the inner tooth means.

The fixation of the hollow gear or annular gear ring means in the housing can be attained in a simple manner thereby that on the outer periphery or circumference of the hollow-gear or annular gear ring means at least one plate, flap or tongue is arranged that projects or engages into a recess or cutout of the housing. It is advantageous when these plates, flaps or tongues are made removable, since such hollow-gear or annular gear ring means then are installable in both transmission parts.

An advantageous embodiment of the invention provides that the planetary transmission gear system has a first transmission drive part only for reduction of the drive speed and has a second transmission drive part with switching or shifting parts. In the first transmission gear system part there is reduced the drive speed which is transferred or transmitted via the shaft to the sun gear. Accordingly there is attained that in the second transmission gear system part the switching or shifting parts carry out a rotation with considerably reduced speed.

It is advantageous when in the first transmission gear system part there are provided first planetary supports or carriers which are mounted or journalled rotationally moveable upon the shaft and having an outer tooth means. The planetary support or carrier of the first transmission gear stage with that drives the planets of the second transmission gear stage. Hereby there is attained a step-wise reduction of the speed.

In the first transmission gear drive part the hollow-gear or annular gear ring means are held fixed against rotation either with the flaps, plates or tongues in the housing or the hollow-gear or annular gear ring means which forms the last drive or transmission gear stage, in a manner similar as also the hollow-gear or annular gear ring means arranged in the second transmission gear part, is arranged rotatable via an adjustment worm in the housing. With this arrangement there can be undertaken a correction of the entire or complete adjustment points of the switching or shifting cams in the second transmission gear drive part.

An advantageous arrangement or embodiment of the invention provides that the planet carrier or support of the last transmission drive gearing stage of the first transmission gear drive part is connected via the outer tooth means thereof with the planets of the first transmission gear drive stage of the second transmission gear drive part.

A further advantageous embodiment provides that the transmission gear drive stages of the second transmission gear drive part are connected via coupling gears which are mounted or journalled rotatably moveable upon the shaft and which drive the planets of the transmission gear drive stage. With this embodiment consequently the planets of the individual transmission gear drive stages of the second transmission gear drive part have the same speed.

It is advantageous, when in the second transmission drive gear part on the outer tooth means of the hollow-gear or annular gear ring means there is arranged an adjustment worm. Hereby there is attained that the turning angle of the shift part connected with the planet carrier or support is adjustable in a stepless manner. The adjustment worm is fastened preferably on the housing of the planetary transmission gear drive means. It serves simultaneously for the hollow-gear or annular gear ring means as a torque (turning moment) support. Through the selected worm pitch or gradient, the worm adjustment drive encounters or finds itself in a self binding relationship.

An advantageous embodiment or arrangement provides that the planets are arranged on pins on the planet carriers or supports. On respectively one planet carrier or support there can be provided differently embodied pins. Hereby it is possible to bring about standstill of individual transmission gear drive stages. Provision can be made for example that the planets have an angular inner bore. With this embodiment, round pins can be provided on the planet carriers or supports and which take up or receive the planets with the angular inner bore in a rotationally moveable manner. On other pins angularly arranged on the planet carrier or supports the planets are fixed securely against rotation. If now a transmission drive gearing stage is to be brought to a standstill, so the planets are inserted over from the round pins onto the angular pins. Furthermore the flaps, plates or tongues for fixation of the hollow-gear or annular gear ring means are removed so that the planet carrier or support and the hollow-gear or annular gear ring means carry out a rotational movement in common.

An advantageous embodiment provides that the shift part is constructed as a cam disk or plate with a shift cam on the outer circumference or periphery thereof. The cam disk or plate can be constructed preferably with fastening muffs for fastening on the angular pins of the planet carrier or support.

This object, and other objects and advantages of the present invention, will appear more clearly from the following specification in connection with the accompanying drawings.

BRIEF DESCRIPTION OF THE DRAWINGS

FIG. 5 is a view of a transmission drive stage in which FIG. 5A illustrates the unlatched position and FIG. 5B illustrates the latched position;

FIG. 6 is a view showing a cam disk or plate of the illustrated embodiment;

FIG. 7 is a view that shows a planet of the illustrated embodiment;

FIGS. 8A and 8B show a planet carrier or support of the first transmission gear drive part in which FIG. 8A is a plan view and FIG. 8B is an elevational view, partly in section;

FIGS. 9A and 9B show a planet carrier or support of the second drive transmission gear part in which FIG. 9A shows a plan view and FIG. 9B shows an elevational view.

DESCRIPTION OF PREFERRED EMBODIMENTS

Figure 1:
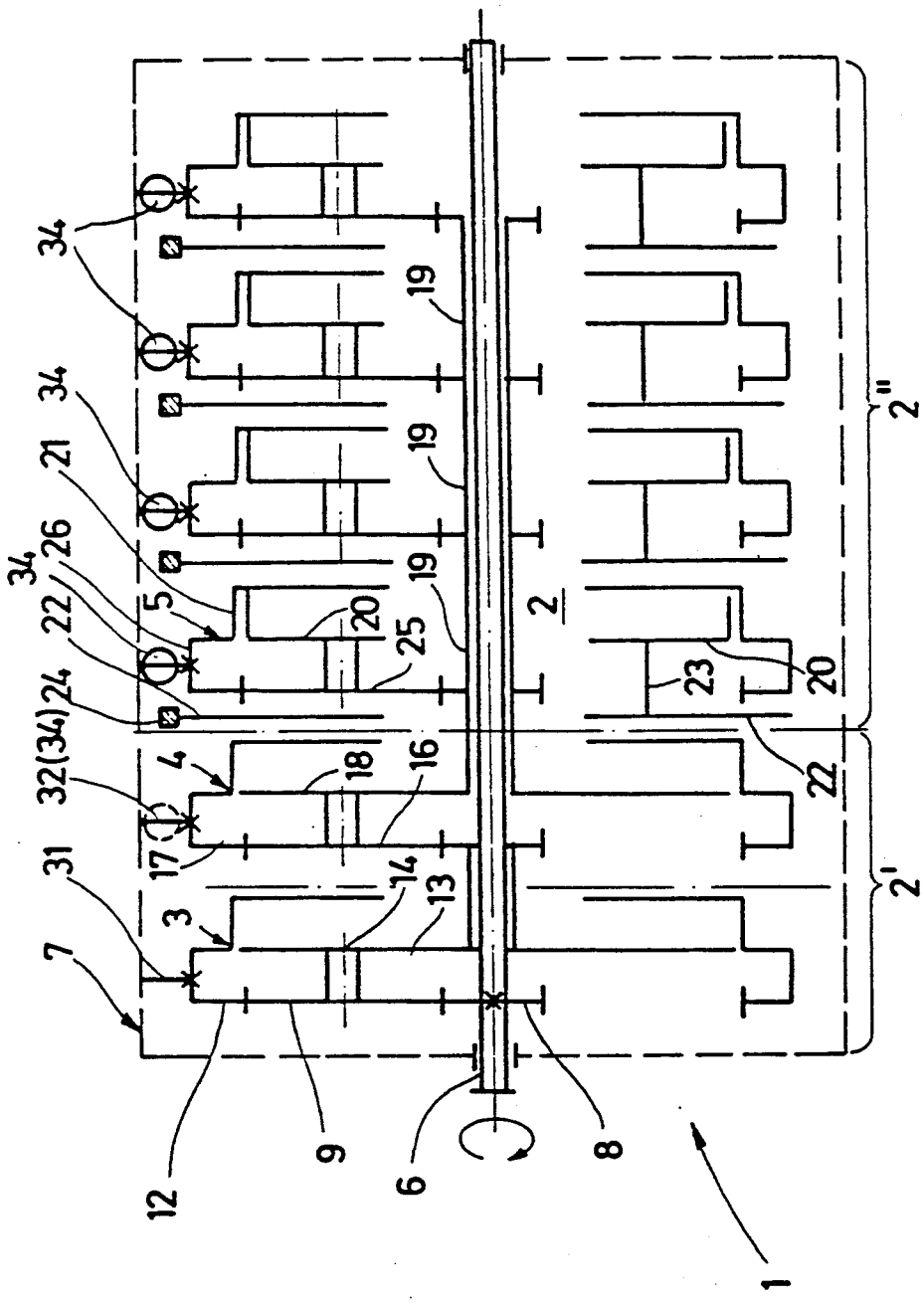
FIG. 1 is a view that shows an embodiment of the invention in a representation of principle.

FIG. 1 shows an end switch or shift means 1 shown in a representation of principle and which is embodied with a planetary transmission gear system drive means 2 that is connected with shift parts 22 for actuation of the shift elements. Such end shifters 1 are installed or employed on a drive unit not illustrated in the drawing. This drive unit, for example, is connected with a part which is to carry out a movement controlled exactly by the end shifter 1.

The end shifter 1 has a housing 7 in which a shaft 6 connected with the drive unit is journalled rotatably moveable. The housing 7 takes up or receives a multi-stage planetary gear drive 2, which has two different types of transmission drive parts 2', 2". The first transmission drive part 2' which is built consisting of the first transmission drive stage 3 and the second transmission drive stage 4 has only the object to reduce the drive speed. Shift parts 22 are arranged in the second transmission drive part 2" connected with the first transmission drive part 2' and these shift parts 22 perform or carry out a rotational movement and actuate shift elements not illustrated in the drawing. The end shifter 1 has four shift parts 22 which carry out a rotational movement with identical speed.

In the following there is now described the arrangement and construction of the planetary transmission gear drive means 2 of the end shifter 1. The planetary transmission drive means 2 per drive stage 3, 4, 5 has a hollow-gear or annular gear ring means 12, 17, 26 fixed on the housing 7 with such hollow-gear or annular gear ring means 12, 17, 26 being provided with an inner tooth means. Furthermore, there are provided relative to the hollow-gear or annular gear ring means 12, 17, 26 respectively the housing 7, rotatably moveable arranged planet carriers or supports 13, 18, 20, which however are constructed or embodied in a different manner in the transmission drive gear parts 2', 2". The planet carriers or supports 13, 18 of the first transmission gear drive part 2' are journalled rotatably moveable upon the shaft 6 and have an outer tooth means. Herewith the rotational movement of the planet carrier or support of the one stage is transmitted or conveyed onto the planets of the other stage. Respectively three identical planets 9, 10. 11 are arranged rotationally moveable on the planet carriers or supports of the transmission gear drive stages.

The planets 9, 10, 11 of the first transmission drive stage 3 are driven via the sun gear 8 arranged fixedly (fixed against rotation) upon the shaft 6. The planets mesh with the inner tooth means of the fixed hollow-gear or annular gear ring means 12, whereby the planet carrier or support 13 performs or carries out a rotational movement. Via the outer tooth means of the planet carrier or support 13, the planets 16 of the second transmission drive gear stage 4 are driven whereby in turn again the planet carrier support 18 is moved into rotation.

The planet carrier or support 18 of the second transmission gear drive stage 4 brings a rotational movement into the second transmission drive part 2". The transmission drive stages of the second transmission drive part are connected with each other via coupling gears 19. The coupling gear 19 of the third transmission drive stage 5 is connected with the planet support or carrier 18 of the second transmission gear drive stage 4 so that the planets of the second transmission gear drive part 2" of the planet transmission drive 2 respectively turn or rotate with the same speed. The four transmission gear drive stages of the second transmission gear part 2" of the planet transmission drive 2 are embodied or constructed in principle identically like the third transmission gear drive stage. Accordingly respectively a planet carrier or support 20 is provided which is arranged rotationally moveable on a slide or guide surface 21 of the hollow-gear or annular gear ring means 28 fixed on the housing 7.

The structural embodiment of the transmission gear drive stages of the planet transmission gear drive 2 with a hollow-gear or annular gear ring means 12, 17, 26 fixed on the housing and a planet carrier or support 13, 18, 20 arranged rotationally moveable effects a greater stiffness of the transmission gear drive and with that brings about a smaller or more nominal reversal or return play. This characteristic of the transmission gear drive is furthermore still more increased thereby that the transmission drive occurs directly via the shaft 6 and the sun gear 8. The center distance errors arising or encountered with end shifters with an indirect drive do not occur or arise with the end shifter 1. The drive moment (impulse, torque) is transmitted centrally and uniformly onto the planets. Via the reduction of the reversal or return play there can be attained a very precise control of the drive unit connected with the end shifter 1.

In the first transmission gear drive part 2' there occurs only a reduction of the drive speed. The speed of the planet carrier or support 18 of the second transmission gear stage respectively the last transmission gear stage of the first transmission gear part 2' is reduced in the same manner in every further stage of the second transmission gear part 2". Accordingly the planet carriers or supports of the transmission gear stages of the second transmission gear part 2" have the same speed.

While the hollow-gear or annular gear ring means 12, 17 of the first transmission gear drive part 2' are fixed by means of plates, flaps or tongues 31, 32 in the housing 7 of the planet transmission gear means 2, the hollow-gear or annular gear ring means of the second transmission gear part 2" are held to the housing adjustable in the positioning thereof. An adjustment worm 34 is provided for this purpose per drive transmission gear stage in the second transmission gear part 2", which worm 34 engages in the outer tooth means of the hollow-gear or annular gear ring means. The adjustment worm 34 serves simultaneously as a fine adjustment of the shift part 22 and as a torque (rotational moment) support for the particular or respective hollow-gear or annular gear ring means.

The planet transmission gear means 2 of the end shifter 1 can be fitted or adapted in an easy manner to the respective requirements or conditions involved. This is possible on the one hand thereby that the sun gear 8 is constructed or embodied with a front or end having an insert or connector coupling, whereby a connection with further sun gears is made possible. Also the individual transmission gear drive stages of the planet drive means 2 can be brought to a standstill in a simple and straight forward manner. This is made possible thereby that on the planet carriers or supports 13, 18, 20 of the transmission gear drive stages of the planet drive means 2, respectively different types of pins are provided for fastening of the planets. With the end shifter 1 on each planet carrier or support 13, 18, 20 respectively three round pins 14 and three angular pins 15 are provided. On the planets of the planet transmission gear drive means 2, which with the end shifter 1 are all embodied identically constructed, there is respectively an angular recess or cutout 9' embodied therewith. If such a planet is arranged or associated on a round pin 14, so the planet can carry out a rotational movement. By rearranging or changing the placement of the planet upon an angular pin 15 there is attained that the planet is fixed with respect to the planet carrier or support. If now the fixation of the hollow-gear or annular gear ring means with the housing 7 is released or dissolved, which can occur in a simple or straight forward manner in the first transmission gear drive part 2' by removal of the plates, flaps or tongues 31, 32, the transmission gear drive stage can be brought to a standstill. With the same transmission gear drive parts accordingly the reduction of the entire transmission gear drive can be changed.

Figure 2:
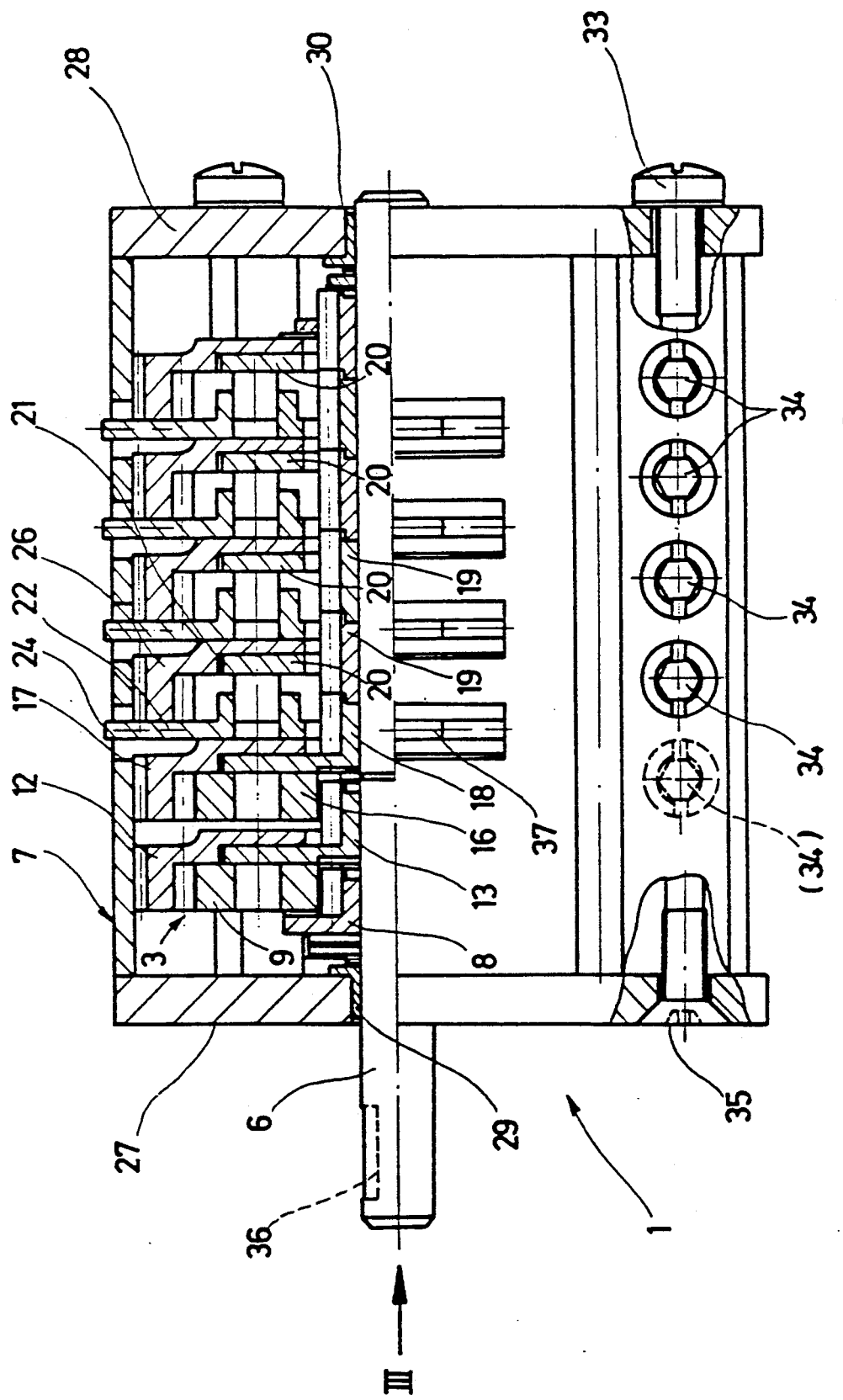
FIG. 2 is a view that shows a schematic representation of the embodiment according to FIG. 1 as seen in a plan view and in part in a longitudinal section.

In FIG. 2 there is a schematic representation of the end shifter 1 shown in a manner of principle in FIG. 1. The housing 7 of the end shifter 1 is made of an aluminum-strand or track press part. This housing 7 surrounds and supports the transmission gear drive block completely. Hereby there is attained that the planet transmission gear drive means 2 is protected against dust and weather influences and conditions. For the exit or discharge of the cam disk or plate 22 respectively of the shift cams 24 there are slots 37 structurally embodied in the housing 7. The end or front plates 22, 28 are fastened by means of housing screws 33, 35. The shaft 6 which is connected via a pass or fitted spring 36 with a non-illustrated drive unit, is journalled rotationally moveable by means of bearing sleeves 29, 30 on the end or front plates 27, 28.

The planet transmission gear drive means 2 of the end shifter 1 has one hollow-gear or annular gear ring means 12, 17, 26 per transmission gear drive stage, which hollow-gear or annular gear ring means is structurally embodied identically in all transmission gear drive stages. Such a hollow-gear or annular gear ring means has an inner tooth means and an outer tooth means and a glide or slide surface 21 for journalling or mounting of the planet carrier or support 20 of the second transmission gear drive part 2". While in the first transmission gear drive part 2" the fixation of the hollow-gear or annular gear ring means occurs on the housing 7 by means of flaps, plates or tongues 31, 32, which are provided on the outer periphery or circumference of the hollow-gear or annular gear ring means, these in the second transmission gear drive part 2" are separate. Here there occurs the fixation of the hollow-gear or annular gear ring means via an adjustment worm 34 which meshes or engages with the outer tooth means of the hollow-gear or annular gear ring means.

Figure 8A:
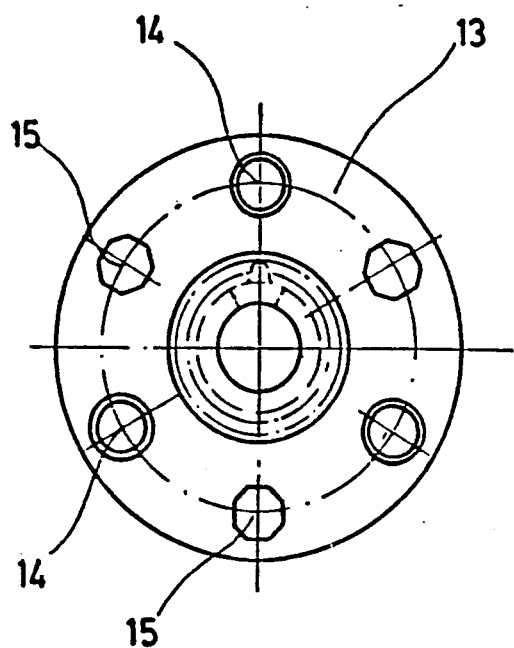
Figure 9A:
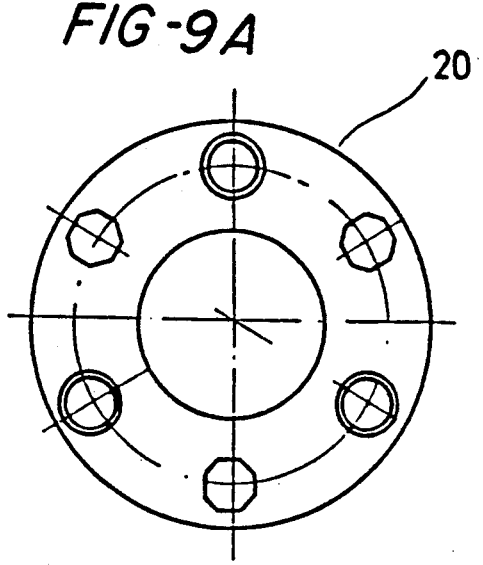
Figure 8B:
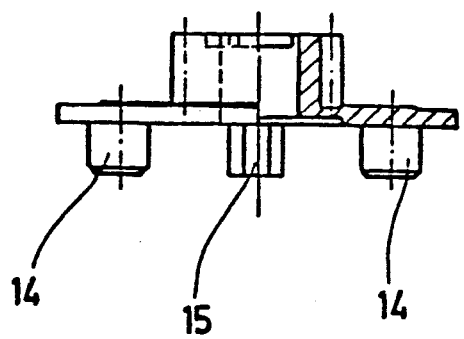
Figure 9B:
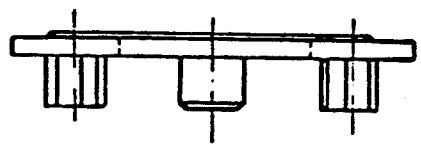

The planet carriers or supports 13, 18 of the first transmission gear drive part 2', which are illustrated separately in FIG. 8, are slideably moveable as journalled upon the shaft 6. The planets of the respectively next transmission gear drive stage mesh as to the outer tooth means. The planet carrier or support 20 of the second transmission gear drive part 2", which are represented and illustrated explicitly in FIG. 9, are journalled on slide surfaces 21 of the respective or particular hollow-gear or annular gear ring means 26.

Below the centerline of FIG. 2 there is shown a plan view of the end shifter 1. Slots or slits 37 for the cam disks 22 are provided in the housing 7 in the second transmission gear drive part 2". In the end region of these slots or slits 37 there are positioned the shift elements of the end shifter 1 not illustrated in the drawing. These are actuated by the shift cams 24 arranged on the cam disk 22. A cam disk 22 with a shift cam 24 is illustrated in FIG. 6 coming into employment with the end shifter 1. Muffs 23 are provided on the cam disk 22 for fastening on the pins of the planet carriers or supports 20 of the second transmission gear drive part 2". The relative position of the cam disks 22 respectively of the shift cams 24 with respect to the shift elements can be changed or varied or adjusted in a stepless manner via the adjustment worm 34. Via the outer tooth means of the hollow-gear or annular gear ring means each cam disk can be adjusted individually and in a stepless manner with the pertaining or associated adjustment worm. The number of cam disks 22 per shift element can differ. The shift elements can be secured or soldered upon a conductor plate which is fastened on the housing 7 in the region of the second transmission gear drive part 2".

It is also possible and advantageous, as indicated in FIGS. 1 and 2 by dash lines, in place of the flap, plate or tongue 32 for fastening of the hollow-gear or annular gear ring means 17 forming the last transmission gear drive stage in the first transmission gear drive parts 2' to provide an adjustment worm 34 as provided for the hollow-gear or annular gear ring means 26 of the second transmission gear drive part 2" embodied moreover identically like the hollow-gear or annular gear ring means 17 and 12. If with this structural variation a correction of the adjustment points of all shift cams 22 in the transmission gear drive means 2" must be carried out, rope-cable or chain lengthening, whereby the setting or adjustment of the shift cam means relative to each other however cannot be permitted to change or vary, this occurs with the additional adjustment worm 34 of the last transmission gear drive stage (hollow-gear or annular gear ring means 17) of the transmission gear drive part 2'. Hereby there is avoided the time consuming and costly setting or adjustment of each individual shift cam 22 in the transmission gear drive part 2". The shift setting or positioning of the individual shift cams 22 with respect to each other are kept or maintained. Via the arrangement of the adjustment cam 34 on the hollow-gear or annular gear ring means 17 of the transmission gear drive part 2' the dissolution or disbandment (cancellation or disruption) of the setting or adjustment path of the shift cams is greater or larger by 4.285-times than the direct setting or adjustment of the shift cams via the adjustment worm means 34 in the transmission gear drive part 2".

Figure 3:
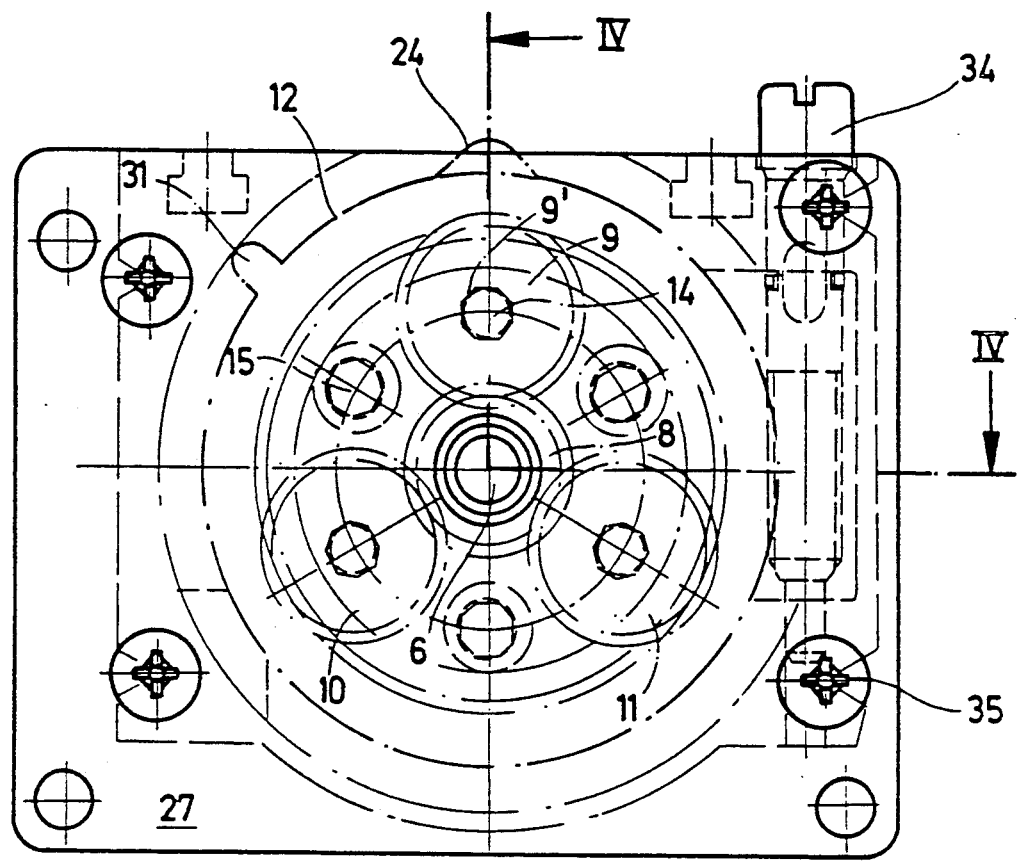
FIG. 3 is a view taken in a direction of an arrow III according to FIG. 2.

In FIG. 3 there is shown a view taken in the direction of the arrow III in accordance with FIG. 2. The front or end plate 27 is fastened on the housing 7 by means of four housing screws 35. The arrangement of the planets 9, 10, 11 between the sun gear 8 and the inner tooth means of the hollow-gear or annular gear ring means 12 is represented by dash lines. On the outer periphery or circumference of the hollow-gear or annular gear ring means 12 there is shown the removable flap, tongue or plate 31 which effects a fixation of the hollow-gear or annular gear ring means 12 in the housing 7. In a plane moved or displaced to the rear there is represented and illustrated a transmission gear drive stage of the second transmission gear drive part 2" of which the hollow-gear or annular gear ring means is adjustably fixed by means of an adjustment worm 34 on the housing 7 and on the planetary carrier or support of which a cam disk 22 with shift cam means 24 is arranged.

Figure 4:
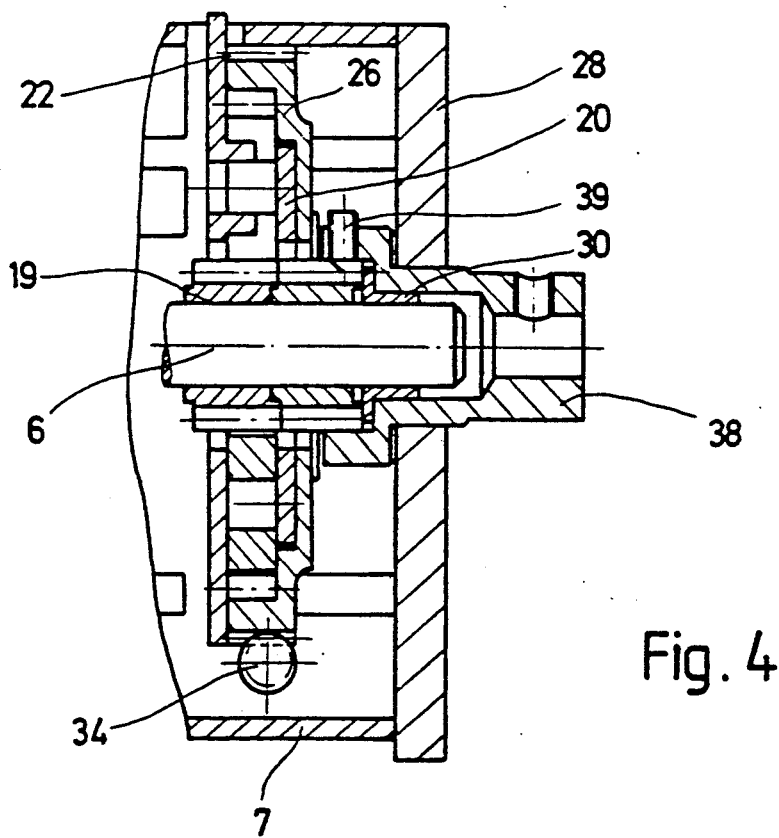
FIG. 4 is a view that shows a cross section taken longitudinally of the line IV—IV according to FIG. 3.

FIG. 4 shows an enlarged illustration of the last transmission gear drive stage of the second transmission gear drive part 2" with a flange 38 for a non-illustrated gauge or measurement-giving means. The flange 38 which, for example, can be connected with a potentiometer drive, is secured or fastened by means of a screw pin 39 on the last coupling gear 19 of the planet gear drive means 2. The flange 38 receives the bearing sleeves 30 for journalling of the shaft 6.

In FIG. 5 there is shown a transmission gear drive stage of the first transmission gear drive part 2' in the left illustration in unlatched position and in the right illustration in latched position as illustrated. This can be attained as already previously set forth by rearrangement or replacement of the planet 9 shown in FIG. 7 with angular recess or receding means 9. While the planets 9, 10 are arranged rotatably moveable upon the round pins 14 in the left portion of the illustration of FIG. 5, the same planets in the right portion of the illustration are rearranged or installed upon the angular pins 15. If now the planets 9, 10, 11 of this transmission gear driving stage are rearranged from the round pins 14 upon the angular pins 15 and the flaps, plates or tongues 31 on the outer periphery or circumference of the hollow-gear or annular gear ring means 12 are removed, accordingly this transmission gear drive stage of the planetary transmission drive means is made inoperative or ineffective. The essential advantage of the novel end shifter is the small or nominal reversal or return in play of the planet transmission gear means. With a planet transmission gear drive means 2, the transmission gear drive stages are constructed or made up respectively of a hollow-gear or angular gear ring means ($z=112/46$), 3 planets ($z=16$), a planet carrier ($z=14$), there were measured on one function pattern or sample a reversal or return play of less than 2°. Hereby there is made possible an especially or particularly accurate control of the drive unit.

Figure 10:
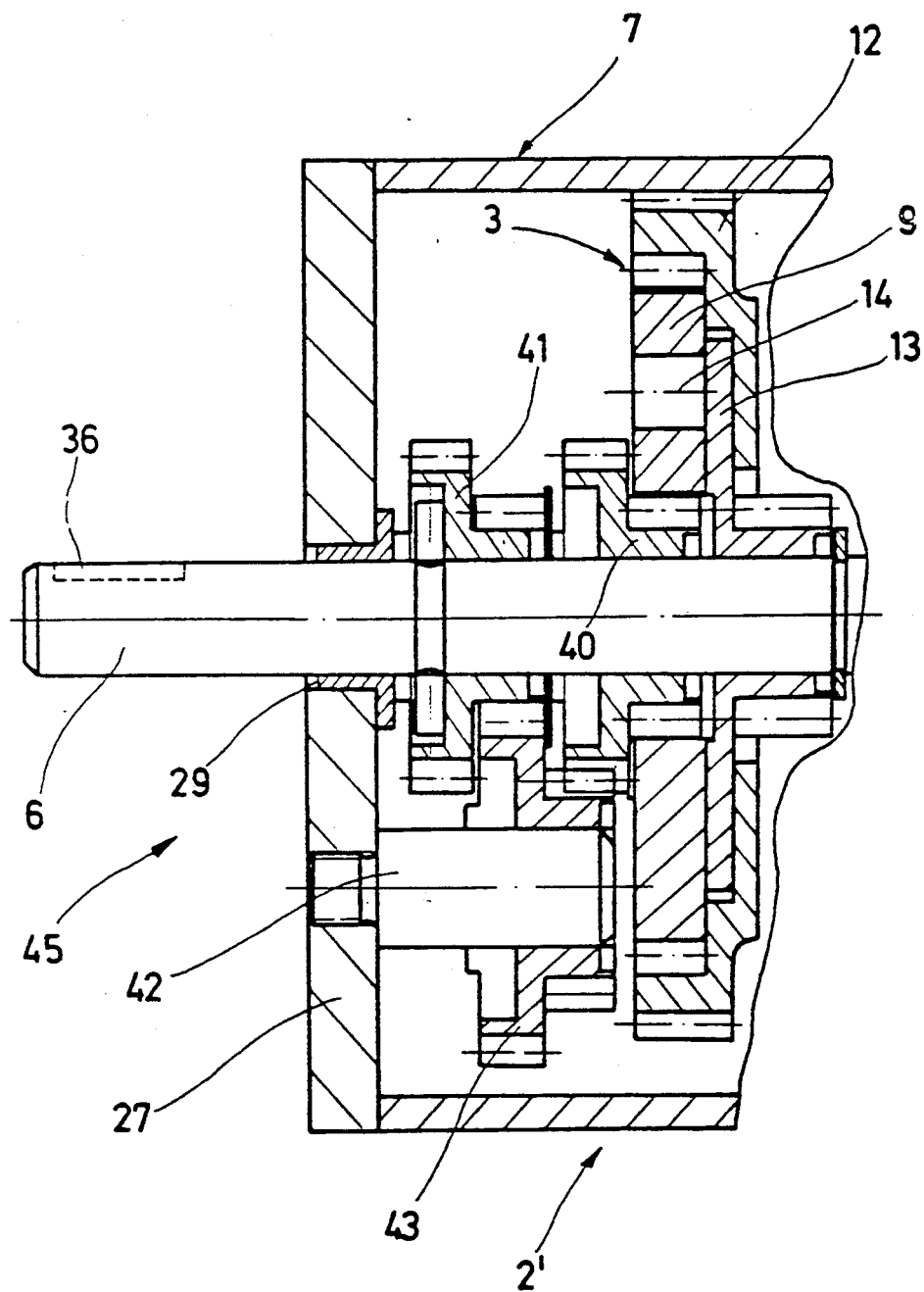
FIG. 10 is a view that shows a further embodiment shown partially in longitudinally section.

FIG. 10 shows a further embodiment of the invention. The end switch or shifter 45 differs from the end switch or shift means 1 by a differently constructed or built-up first transmission gear drive part 2'. The second transmission gear drive part 2" is constructed or embodied corresponding to the end switch or shifter 1. The reference numeral designations set forth for describing the end switch or shifter 1 are correspondingly utilized and employed with the end switch or shifter 45.

A drive gear 41 is fastened rigidly or fixed against rotation via a fitting or pass spring 36 with the shaft 6 connected with a non-illustrated drive unit. The drive gear 41 drives via the outer tooth means thereof a gear 45 arranged rotatably moveable upon the axis or axle 42. The axis 42 is screwed rigidly against rotation with the front end or face plate 27 of the housing 7. The gear 43 has two outer tooth means, whereby the sun gear of a first transmission gear drive stage 3 journalled rotatably moveable upon the shaft 6 meshes with the outer tooth means having a smaller diameter. In this transmission gear drive part there is consequently attained a reduction of the drive speed.

The present invention is, of course, in no way restricted to the specific disclosure of the specification and drawings, but also encompasses any modifications within the scope of the appended claims.

What we claim is:

1. An apparatus for actuation of shift elements, with a multi-stage planet transmission gear drive means reducing the drive speed of a separate drive unit, which drives a shift part, which actuates the shift element according to a fixable rotation, comprising the housing of a planet transmission gear means and a shaft journalled in said housing, said shaft being connected directly with a separate drive unit, each transmission gear drive stage having a planet support carrier arranged rotatably moveable and coaxial with respect to said shaft, a planet means held on said planet carrier support, an annular gear ring means fixed with respect to said housing and in mesh with said planet;

a sun gear included with the first transmission gear drive stage driveably arranged upon said shaft; and a shift part in at least one further drive stage fastened on a planet support carrier thereof; in a first transmission gear drive part having at least one of the annular gear ring means held fixed against rotation secured by at least one flat means in said housing; and a last transmission gear drive stage including an annular gear ring means of a first transmission gear drive part arranged rotatably in said housing.

2. An apparatus according to claim 1, in which said annular gear ring means forming the last transmission gear drive stage is provided with outer tooth means; and an adjustment worm guided in said housing engages in meshing relationship with said outer tooth means.

* * * * *